United States Patent
Sugawara et al.

(10) Patent No.: US 7,734,370 B2
(45) Date of Patent: Jun. 8, 2010

(54) DISPOSAL PROCESSING SYSTEM AND DISPOSAL PROCESSING APPARATUS

(75) Inventors: Takashi Sugawara, Kanagawa (JP); Hitoshi Suzuki, Kanagawa (JP); Hiroyoshi Uejo, Kanagawa (JP); Kengo Shinozaki, Kanagawa (JP); Ryuuichi Shiraishi, Kanagawa (JP); Shunsuke Hamasuna, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 680 days.

(21) Appl. No.: 11/519,760

(22) Filed: Sep. 13, 2006

(65) Prior Publication Data
US 2007/0177218 A1    Aug. 2, 2007

(30) Foreign Application Priority Data
Jan. 31, 2006 (JP) .............................. 2006-022697

(51) Int. Cl.
G06F 7/00 (2006.01)
G01N 37/00 (2006.01)

(52) U.S. Cl. .................. 700/226; 700/32; 700/275; 702/82; 241/28; 241/34; 358/1.14

(58) Field of Classification Search ................. 700/215, 700/275, 32, 223–226; 358/1.14, 448, 2.1; 241/33, 34, 101.2, 28; 29/4.51; 702/82
See application file for complete search history.

(56) References Cited

U.S. PATENT DOCUMENTS
2006/0290967 A1* 12/2006 Sumitomo et al. ......... 358/1.14
2007/0075168 A1* 4/2007 Rodriguez et al. ............ 241/36
2007/0147710 A1* 6/2007 Kanamoto et al. .......... 382/309

FOREIGN PATENT DOCUMENTS
JP    A 2002-368966    12/2002

OTHER PUBLICATIONS
U.S. Appl. No. 11/404,804, filed Apr. 17, 2006 in the name of Shunsuke Hamasuna et al.
U.S. Appl. No. 11/513,195, filed Aug. 31, 2006 in the name of Shusaku Kubo et al.

(Continued)

*Primary Examiner*—Paul L Rodriguez
*Assistant Examiner*—Sheela Rao
(74) *Attorney, Agent, or Firm*—Oliff & Berridge, PLC.

(57) ABSTRACT

A disposal processing system is provided and includes: a disposal section that disposes of a document; a reading section that reads identification information of the document, the identification information being attached to an image on the document; a judging section that makes a judgment whether disposal of the document is permitted on the basis of the identification information; and a controller that controls the disposal section so that the disposal section disposes of the document at least one of: when the judging section makes a judgment that the disposal of the document is permitted; and when the controller acquires information indicating that the disposal of the document is permitted while the judging section makes a judgment that the disposal of the document is prohibited, and so that the disposal section does not dispose of the document when the judging section makes the judgment that the disposal of the document is prohibited.

20 Claims, 10 Drawing Sheets

OTHER PUBLICATIONS

U.S. Appl. No. 11/519,807, filed Sep. 13, 2006 in the name of Hiroyoshi Uejo et al.
U.S. Appl. No. 11/519,850, filed Sep. 13, 2006 in the name of Ryuuichi Shiraishi et al.
U.S. Appl. No. 11/519,806, filed Sep. 13, 2006 in the name of Hitoshi Suzuki et al.
U.S. Appl. No. 11/519,803, filed Sep. 13, 2006 in the name of Shunsuke Hamasuna et al.
U.S. Appl. No. 11/519,827, filed Sep. 13, 2006 in the name of Kengo Shinozaki et al.

* cited by examiner

FIG. 8

| DOCUMENT ID | DOCUMENT GENERATION DATE | DOCUMENT STORAGE PERIOD | DOCUMENT DISPOSAL DATE | INFORMATION ON CONFIRMING PRESENCE OF ORIGINALITY-ASSURED ELECTRONIC DOCUMENT |
|---|---|---|---|---|
| 0000000001 | 1998.5.31 | 2004.5.31 | 2004.6.15 | UNCONFIRMED |
| 0000000002 | 1998.6.12 | 2001.6.12 | 2001.6.30 | CONFIRMED |
| ... | ... | ... | ... | ... |
| 0000012345 | 2000.10.20 | UNSPECIFIED | 2000.8.26 | CONFIRMED |
| 0000012346 | 2000.10.25 | PERMANENT | | UNCONFIRMED |
| ... | ... | ... | ... | ... |
| 0000123456 | 2002.8.15 | 2005.8.15 | NOT DISPOSED OF | CONFIRMED |
| ... | ... | ... | ... | ... |

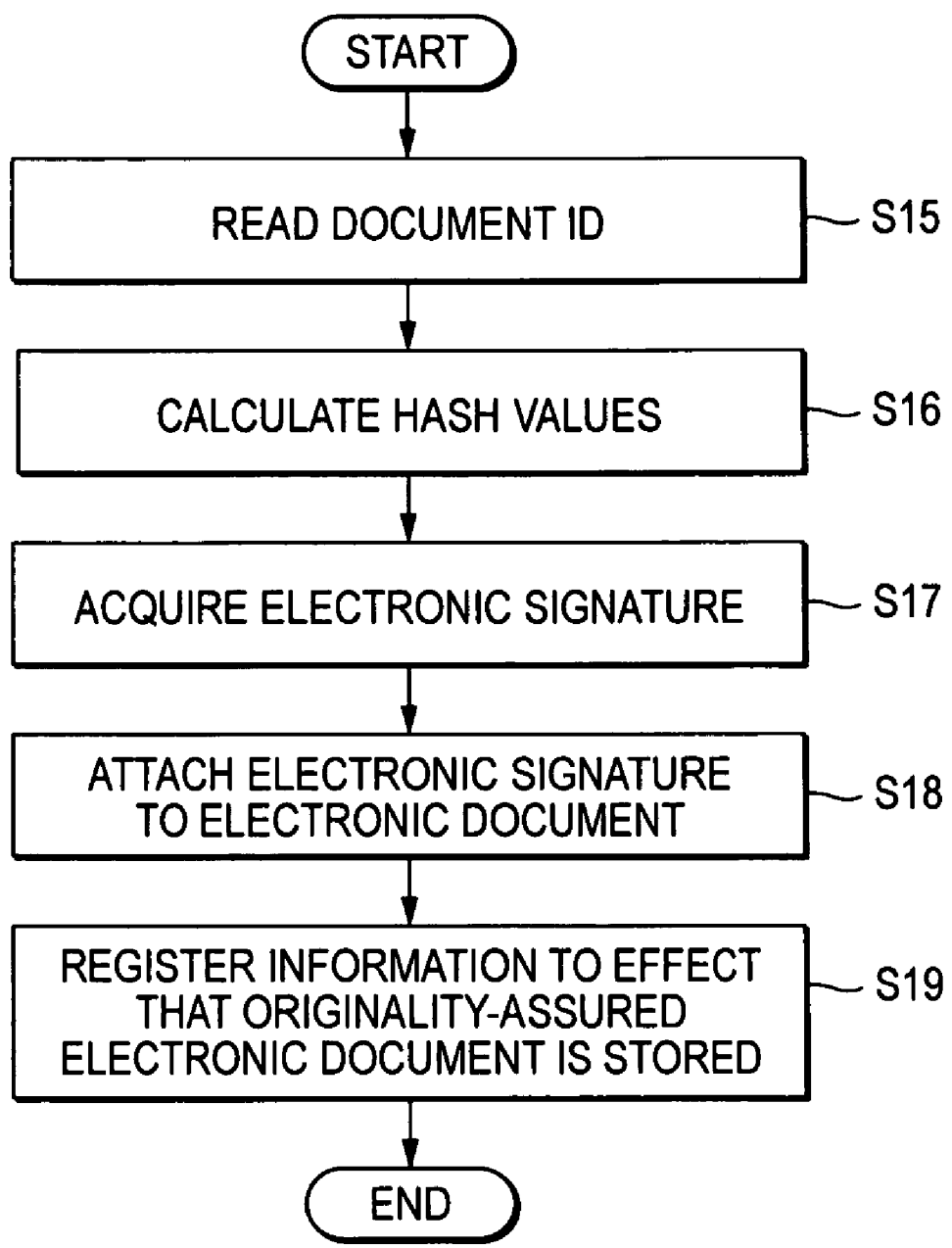

DISPOSAL PROCESSING SYSTEM AND DISPOSAL PROCESSING APPARATUS

BACKGROUND (i) Technical Field

The present invention relates to a disposal processing system and a disposal processing apparatus which are suitable for use in document management.

(ii) Related Art

In general, many secret documents that should be kept secret from outsiders (e.g., parties outside the company) are handled in offices of companies and public organizations such as city halls. To prevent leakage to third parties, the originals of such secret documents are kept in storage under strict management. On the other hand, secret documents that are no longer necessary are disposed of with a shredder or the like.

In many cases, compulsory storage periods are specified for secret documents relating to accounting (bills, receipts, statements of accounts, etc.). Therefore, before disposing of a secret document by shredding, a person in charge needs to confirm, using a register of originals or the like, that disposal of the secret document the person is going to dispose of is really appropriate.

However, in the case of disposing of a large number of secret documents, the work of disposing of the secret documents while checking their respective storage periods one by one is very troublesome and takes long time. Furthermore, there is a risk that a secret document whose storage period has not expired yet may be discarded erroneously due to a human check error.

SUMMARY

According to an aspect of the present invention, there is provided a disposal processing system including: a disposal section that disposes of a document; a reading section that reads identification information attached to an image on the document; a judging section that makes a judgment whether disposal of the document is permitted on the basis of the identification information read by the reading section; and a controller that controls the disposal section so that the disposal section disposes of the document at least one of: when the judging section makes a judgment that the disposal of the document is permitted; and when the controller acquires information indicating that the disposal of the document is permitted while the judging section makes a judgment that the disposal of the document is prohibited, and so that the disposal section does not dispose of the document when the judging section makes the judgment that the disposal of the document is prohibited.

BRIEF DESCRIPTION OF THE DRAWINGS

Embodiments of the present invention will be described in detail based on the following figures, wherein:

FIG. 8 shows an exemplary document management table;

FIG. 10 is a flowchart of a procedure which is followed in registering information indicating that an originality-assured electronic document is stored.

DETAILED DESCRIPTION

Disposal processing systems and disposal processing apparatus according to exemplary embodiments in an aspect of the present invention, which are directed to, for example, a case of disposing of a document, will be hereinafter described in detail with reference to the drawings.

Figure 1:
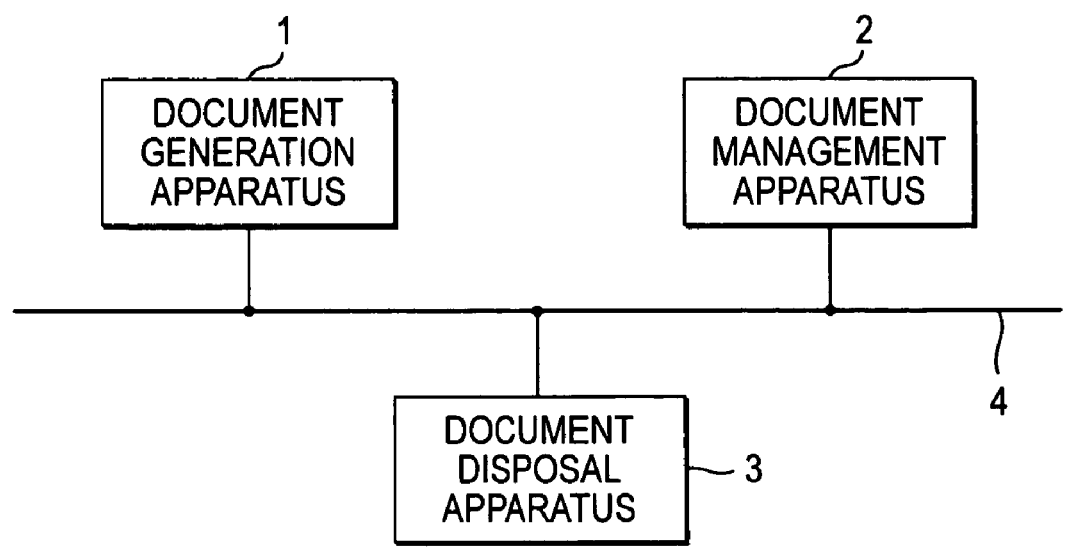
FIG. 1 shows a configuration of a document management system according to an aspect of the present invention.

FIG. 1 shows a configuration of a document management system according to an aspect of the invention. The illustrated document management system includes a document generation apparatus 1, a document management apparatus 2, and a document disposal apparatus 3, which are connected to a common network 4.

The document generation apparatus 1 generates a document (for example, paper document) to which a document ID is attached. The document management apparatus 2 performs various kinds of management processing on documents generated by the document generation apparatus 1. The document disposal apparatus 3 performs disposal processing on documents generated by the document generation apparatus 1 and other documents. The network 4 is configured by using a LAN (local area network) or a WAN (wide area network), for example.

Figure 2:
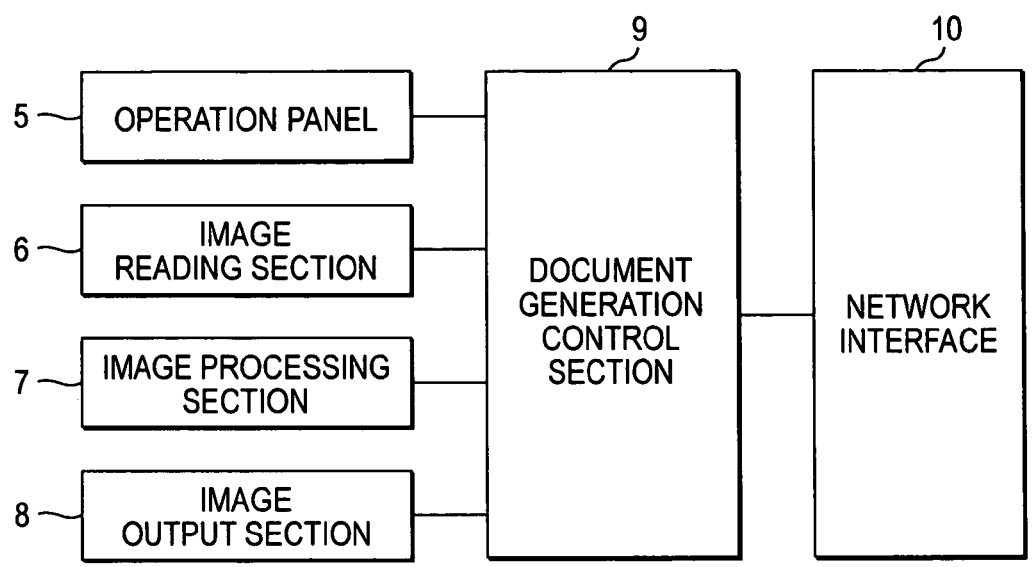
FIG. 2 is a block diagram showing an exemplary configuration of a document generation apparatus.

FIG. 2 is a block diagram showing an exemplary configuration of the document generation apparatus 1. The document generation apparatus 1 is configured by using a digital copier, a digital multi-function machine (copier), or the like. The document generation apparatus 1 includes an operation panel 5, an image reading section 6, an image processing section 7, an image output section 8, a document generation control section 9, and a network interface 10.

The operation panel 5 serves as a user interface through which a user of the document generation apparatus 1 inputs various kinds of information and on which various kinds of information are displayed for the user. For example, the operation panel 5 includes an input unit having various buttons, switches, keys, etc. and a display unit which is a liquid crystal panel with a touch panel.

The image reading section 6 optically reads images of a document as a subject of reading. The image reading section 6 generates image data (scanning data) corresponding to a document sheet image by applying light to the surface of a document sheet set on a transparent document table (platen glass) and forming an image of reflection light returning from the document sheet surface on the photodetecting surface of a reading sensor (CCD sensor or the like) via an image forming optical system including mirrors and lenses. During that course, the document sheet surface is scanned for reading as the image forming optical system is moved.

The image processing section 7 performs image processing (e.g., color conversion, color correction, gradation correction, enlargement/reduction, image rotation, and screen generation) on the image data produced by reading the document with the image reading section 6.

The image output section 8 prints the image data produced by the reading by the image reading section 6 and subjected to the image processing by the image processing section 7 on recording media such as sheets. The image output section 8 prints the image data by an electrophotographic method, for example.

The document generation control section 9 controls various operations relating to document generation. The document generation control section 9 controls operations of the operation panel 5, the image reading section 6, the image processing section 7, and the image output section 8 according to control programs given in advance. Furthermore, the document generation control section 9 controls an operation of taking in the data, produced by reading by the image reading section 6, of a document and a QR code printed on the document, generating an originality-assured electronic document, and causing information to that effect to be registered in a document management table (described later). The document generation control section 9 calculates hash values (generated by using an irreversible, unidirectional function; an original text cannot be reproduced from the hash values) from the image data produced by reading the document with the image reading section 6 and sends those to an external authentication organization via the network interface 10. The external authentication organization generates a digital signature by performing various kinds of processing such as encryption processing or time stamping as time authentication on the received hash values, and returns it to the document generation control section 9. The document generation control section 9 attaches the received electronic signature to the electronic document of the document and stores the resulting electronic document (the electronic-signature-attached electronic document) in a storage device (not shown). The document generation control section 9 recognizes the document ID from the QR code that is printed on the document, and stores the electronic-signature-attached electronic document in the storage device (not shown) in such a manner that it is correlated with the document ID. When the electronic-signature-attached electronic document has been stored, the document generation control section 9 causes information to the effect that an originality-assured electronic document has been stored to be registered in a document management table in such a manner that it is correlated with the document ID.

Alternatively, the external authentication organization may generate an electronic signature from the hash values and attach the electronic signature to the electronic document from which the hash values were generated. In this case, the document generation control section 9 sends the electronic document of the document to the external authentication organization. Hash values may be generated either in the document generation control section 9 or the external authentication organization. When an electronic signature is attached to the electronic document in the external authentication organization, the external authentication organization sends the electronic-signature-attached electronic document to the document generation control section 9. When receiving the electronic-signature-attached electronic document, the document generation control section 9 stores it in the storage device (not shown) and causes information to the effect that an originality-assured electronic document has been stored to be registered in the document management table. Since the digital signature is generated from the hash values which are generated from the electronic document of the original document by using the unidirectional function, it is difficult to reproduce the electronic document of the original document from the electronic signature. Therefore, even if the electronic document is falsified, whether it has been falsified can be determined later. That is, if the electronic document of the original document is falsified, a comparison between hash values generated again from the falsified electronic document and the hash values from which the electronic signature attached to the electronic document was generated shows that the two kinds of hash values are different from each other and hence it turns out that the electronic document of the original document has been falsified.

The network interface 10 is a communication interface via which the document generation apparatus 1 exchanges data with other apparatus (including the document management apparatus 2 and the document disposal apparatus 3) over the network 4. Data exchange via the network interface 10 is controlled by the document generation control section 9.

Figure 3:
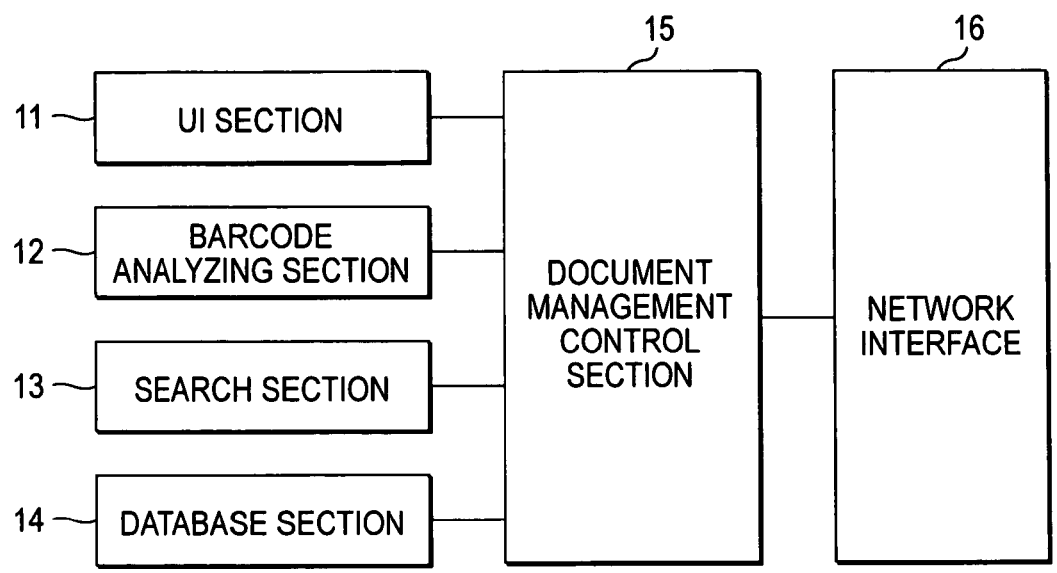
FIG. 3 is a block diagram showing an exemplary configuration of a document management apparatus.

FIG. 3 is a block diagram showing an exemplary configuration of the document management apparatus 2. The document management apparatus 2 is configured by using a personal computer, for example. The document management apparatus 2 includes a user interface section (UI section) 11, a bar code analyzing section 12, a search section 13, a database section 14, a document management control section 15, and a network interface 16.

The user interface section 11 is a user interface through which a user of the document management apparatus 2 inputs various kinds of information and on which various kinds of information are displayed for the user. For example, the user interface section 11 includes input devices such as a keyboard and a mouse and a display device such as a liquid crystal display.

The bar code analyzing section 12 analyzes and decodes a bar code that is contained in image data (scanning data). A bar code to be analyzed by the bar code analyzing section 12 is one that is contained in image data obtained when images of a document with a bar code are read by the document generation apparatus 1. This bar code is obtained by encrypting information including at least a document ID. In general, bar codes are generally classified into one-dimensional bar codes in which pieces of information are arranged only in one direction and two-dimensional bar codes in which pieces of information are arranged in two orthogonal directions. Bar codes of both types can be used in practicing an aspect of the invention. However, where it is desired to have a bar code contain not only a document ID but also other various kinds of information and data, it is desirable to use a two-dimensional bar code having a larger data capacity. This embodiment employs, as an example, a QR code (registered trademark) which is a kind of two-dimensional bar code and is now widespread. The bar code may be a mere array of numerals, alphabetical characters, etc. or a document ID itself. In this case, the bar code analyzing section 12 recognizes a mere array of numerals, alphabetical characters, etc. or a document ID itself.

The search section 13 searches data accumulated in the database section 14. The database section 14 accumulates various kinds of data. User authentication information (described later) is also stored in the database section and is made a subject of a search by the search section 13. For example, the database section 14 is configured by using a hard disk drive.

The document management control section 15 controls various operations relating to document management. The document management control section 15 controls operations of the user interface section 11, the bar code analyzing section 12, the search section, and the database section 14 according to control programs given in advance.

The network interface 16 is a communication interface via which the document management apparatus 2 exchanges data with other apparatus (including the document generation apparatus 1 and the document disposal apparatus 3) over the network 4. Data exchange via the network interface 16 is controlled by the document management control section 15.

Figure 4:
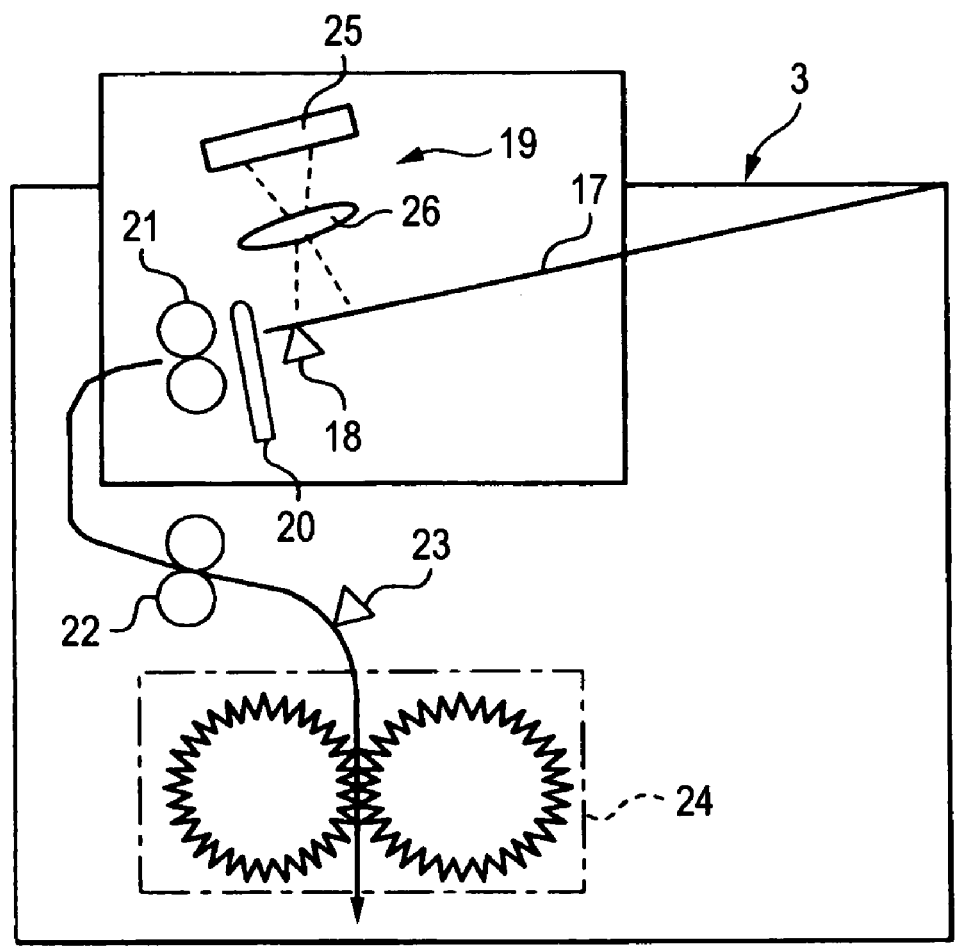
FIG. 4 schematically shows an exemplary mechanism of a manual-feed-type document disposal apparatus.

FIG. 4 schematically shows an exemplary mechanism of a manual-feed-type document disposal apparatus 3. The document disposal apparatus 3, which is configured by using a shredder, for example, is equipped with a document tray unit 17, an insertion sensor 18, a reading optical system 19 of a bar code reader, a stopper 20, pairs of feed rolls 21 and 22, a passage sensor 23, and a shredder unit 24.

The document tray unit 17 is a unit on which a document as a subject of disposal is placed. The document tray unit 17 is inclined from the horizontal plane so as to descend gradually toward the stopper 20. The back side (lower side) of the document tray unit 17, together with the insertion sensor 18, the reading optical system 19, the stopper 20, and the feed rolls 21, is covered with a cover member (not shown).

The insertion sensor 18 detects a document that has been inserted to a reading position on the document tray unit 17. For example, the insertion sensor 18 is a reflection-type optical sensor having a light-emitting element and a photodetector. The insertion sensor 18 is rendered in an on state when a document exists at its sensing position and in an off state when no document exists at the sensing position.

The reading optical system 19 of the bar code reader is configured in such a manner that light emitted from a light source (not shown) is applied to a bar code recording portion of a document as a subject of disposal and an area sensor 25 captures a bar code image by detecting reflection light via a lens 26. The bar code recording portion is a portion of a document surface where a bar code is recorded which includes a document ID and other information. The bar code recording portion is located at a corner position of a document and its dimensions are predetermined.

The stopper 20 has a long plate-like structure, for example, and is disposed between the insertion sensor 18 and the feed rolls 21. The stopper 20 opens or closes a document transport passage formed by the pairs of feed rolls 21 and 22 at its entrance. In a closed state, the stopper 20 is projected so as to interrupt a document path from the document tray unit 17 to the feed rolls 21. Therefore, in this state, if a user tries to insert a document inward on the document tray unit 17, the head of the document butts against the stopper 20. In contrast, in an open state, the stopper 20 is retracted from the document path from the document tray unit 17 to the feed rolls 21. Therefore, if a user tries to insert a document inward on the document tray unit 17, the head of the document butts into the nip portion of the feed rolls 21.

Figure 5:
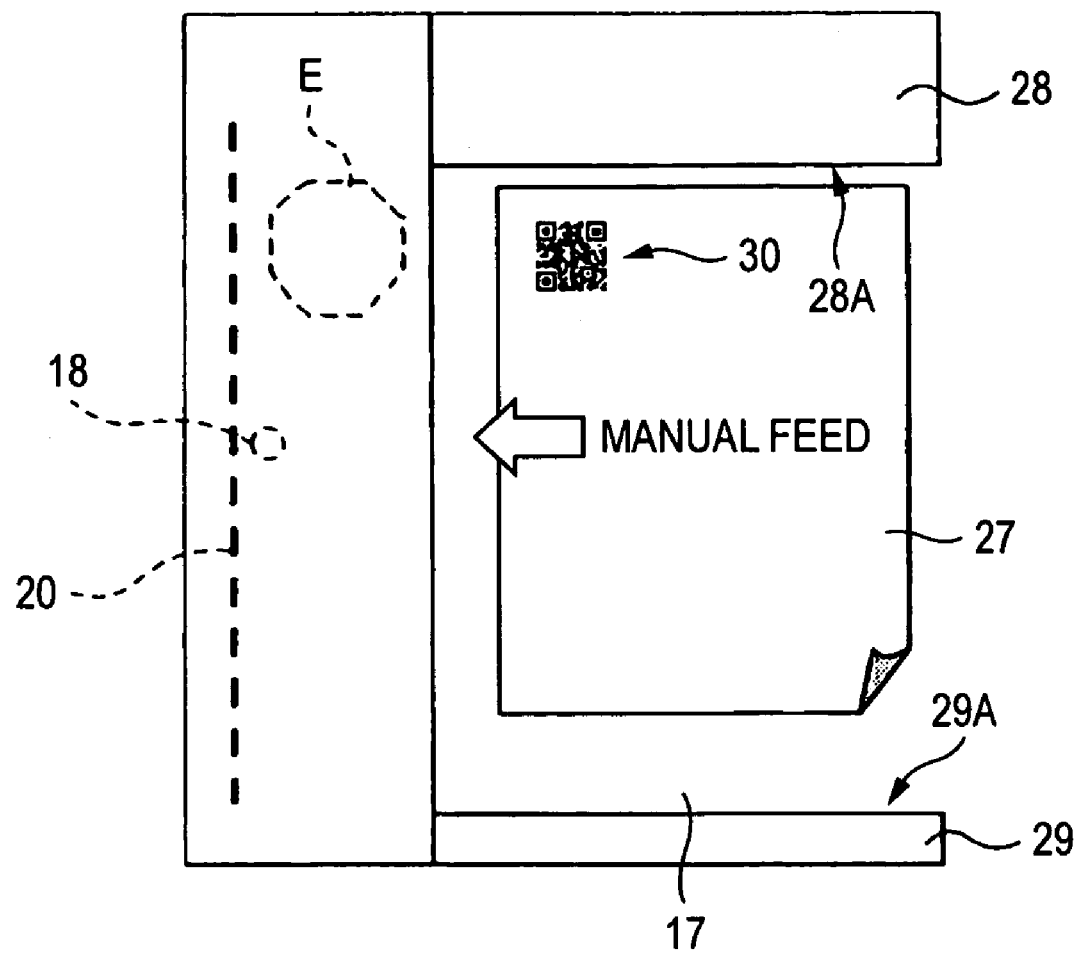
FIG. 5 is a top view of a document tray unit.

FIG. 5 is a top view of the document tray unit 17. The document tray unit 17 is equipped with insertion guides 28 and 29 on both sides of a passage along which a document 27 is inserted manually (the insertion direction is indicated by an arrow). The insertion guides 28 and 29 have respective guide surfaces 28A and 29A which are parallel with the document insertion direction. Whereas the insertion guide 28 is fixed, the insertion guide 29 can be moved in the document width direction (vertical direction in FIG. 5) if necessary. The document 27 as a subject of disposal is inserted on the document tray unit 17 in the arrow direction with an orientation that a bar code recording portion 30 is located at a head-side corner position. At this time, to position the document 27 in the direction perpendicular to the insertion direction, one sideline of the document 27 is fully brought into contact with the guide surface 28A of the insertion guide 28.

As a result, in a state that the head of the document 27 is in contact with the stopper 20 as a result of manual insertion by a user, the bar code recording portion 30 is positioned inside a code reading area E of the bar code reader. The insertion sensor 18 is disposed immediately upstream of the stopper 20 in the document insertion direction. Therefore, the insertion sensor 18 is switched from an off state to an on state immediately before the head of the document 27 butts against the stopper 20 as it is inserted manually by a user. Therefore, on-timing of the insertion sensor 18 indicates a time point when the bar code recording portion 30 of the document 27 is put in the code reading area E.

The feed rolls 21 rotate while nipping a document that has been introduced by opening the stopper 20, and thereby transport the document along a document transport passage, which is formed by a transport guide member (chute or the like; not shown). The feed rolls 22 rotate while nipping a document that has been transported by the feed rolls 21, and thereby transport the document to the shredder unit 24 along the document transport passage.

The passage sensor 23 is disposed at a halfway position (approximately at the center) of the document transport passage from the feed rolls 22 to the shredder unit 24 and detects a passage of a document. For example, the passage sensor 23 is a reflection-type optical sensor having a light-emitting element and a photodetector. The passage sensor 23 is rendered in an on state if a document exists at the sensing position and in an off state if no document exists at the sensing position. Therefore, the passage sensor 23 is switched from an off state to an on state at the same time as the head of a document passes its sensing position. When the tail of the document thereafter passes the sensing position, the passage sensor 23 is switched from the on state to an off state.

The shredder unit 24 shreds a document fed by the feed rolls 22 while pulling the document into itself in one direction (indicated by an arrow). The shredder unit 24 can shred plural document sheets (e.g., a bundle of about 20 A4-size plain sheets) together. Furthermore, the shredder unit 24 can shred even stapled document sheets as they are (i.e., in a state that staples are not removed).

Figure 6:
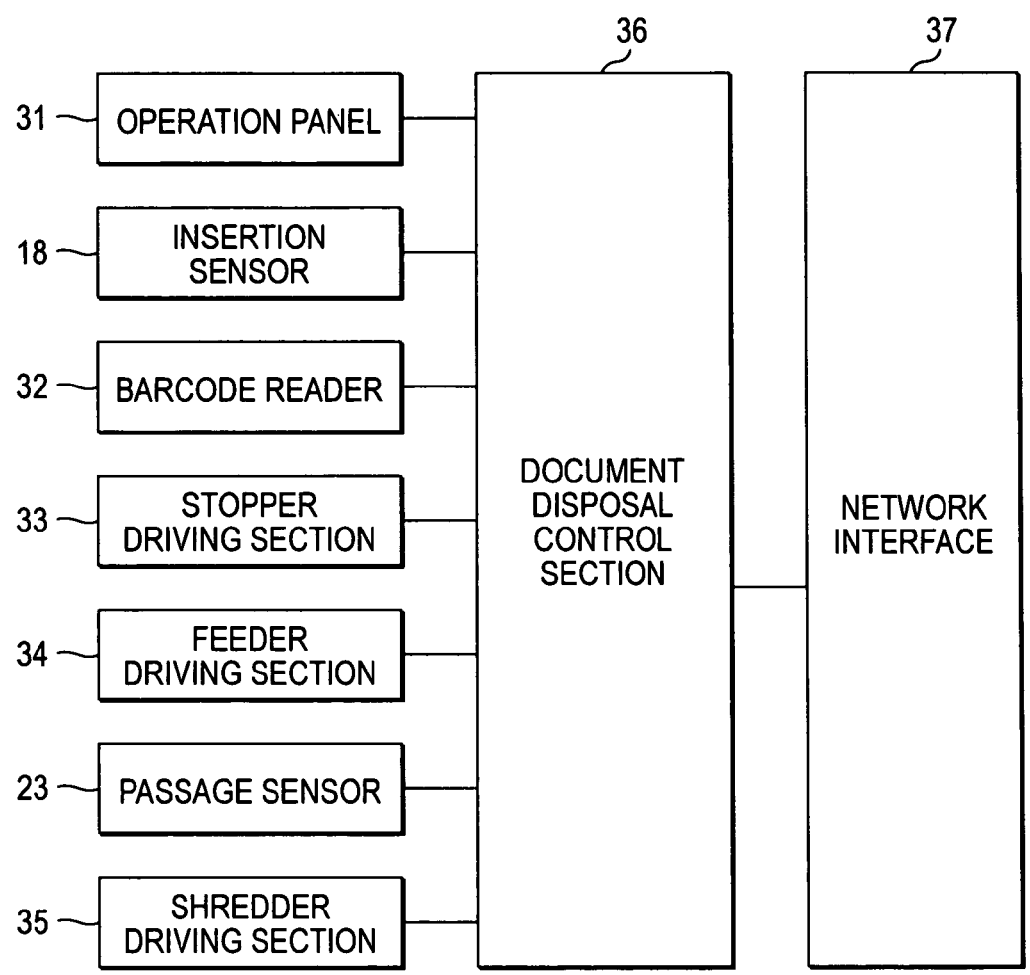
FIG. 6 is a block diagram showing an exemplary configuration of a manual-feed-type document disposal apparatus.

FIG. 6 is a block diagram showing an exemplary configuration of the manual-feed-type document disposal apparatus 3. The document disposal apparatus 3 is equipped with, in addition to the above-described components, an operation panel 31, a bar code reader 32, a stopper driving section 33, a feeder driving section 34, a shredder driving section 35, a document disposal control section 36, and a network interface 37.

The operation panel 31 is manipulated by a user who uses the document disposal apparatus 3. For example, the operation panel 31 is configured by using manipulation buttons (e.g., a start button and a stop button) and a display panel which displays an operation status of the document disposal apparatus 3 and various messages including manipulation guidance messages. The operation panel 31 is configured so as to enable input of user authentication information through itself. That is, since user authentication information includes numerals, alphabetical characters, etc., the operation panel 31 is configured so as to display a keyboard picture which enables input of those.

The bar code reader 32 optically reads, using the above-described reading optical system 19, a bar code that is attached to a document by printing, and outputs original information (data) contained in the bar code provided in the document.

The stopper driving section 33 opens (retracts) or closes (projects) the stopper 20. For example, the stopper driving section 33 may be configured by using an electromagnetic plunger as a drive source.

The feeder driving section 34 rotates the above-described feed rolls 21 and 22. For example, the feeder driving section 34 may be configured by using a motor as a drive source.

The shredder driving section 35 rotates the above-described shredder unit 24. For example, the shredder driving section 35 may be configured by using a motor as a drive source.

The document disposal control section 36 controls various operations relating to document disposal. The document disposal control section 36 controls operations of the bar code reader 32, the stopper driving section 33, the feeder driving section 34, and the shredder driving section 35 according to control programs given in advance. The above-described insertion sensor 18 and passage sensor 23 are electrically connected to the document disposal control section 36.

The network interface 37 is a communication interface via which the document disposal apparatus 3 exchanges data with other apparatus (including the document generation apparatus 1 and the document management apparatus 2) over the network 4. Data exchange via the network interface 37 is controlled by the document disposal control section 36.

Next, a document management method using the above-configured document management system will be described. Documents to which the invention is directed are ones generated by the document generation apparatus 1 while being assigned unique document IDs individually. The document ID may consist of only numerals or may be formed by combining numerals, alphabetical characters, symbols, etc. as appropriate. A specific management method that is directed to a case of handling documents to serve as vouchers for an accounting audit, a tax audit, etc. will be described below.

Figure 7A:
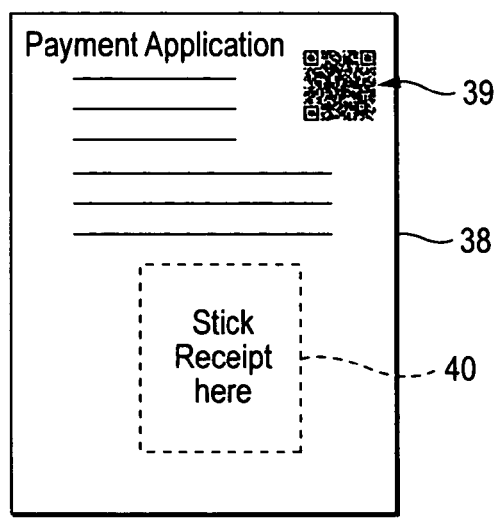
FIGS. 7A and 7B illustrate an exemplary manner of generation of a document.

First, for example, a form of a payment application document 38 as shown in FIG. 7A is generated by inputting document data (electronic data) with a bar code to serve as a document template to the document generation apparatus 1 and printing the document data on a sheet with the image output section 8. For example, the document data may be generated by the document management apparatus 2 and sent from the document management apparatus 2 to the document generation apparatus 1 over the network 4. Alternatively, the document data may be generated separately by a server apparatus for document data generation and sent from the server apparatus to the document generation apparatus 1 over the network 4.

Figure 7B:
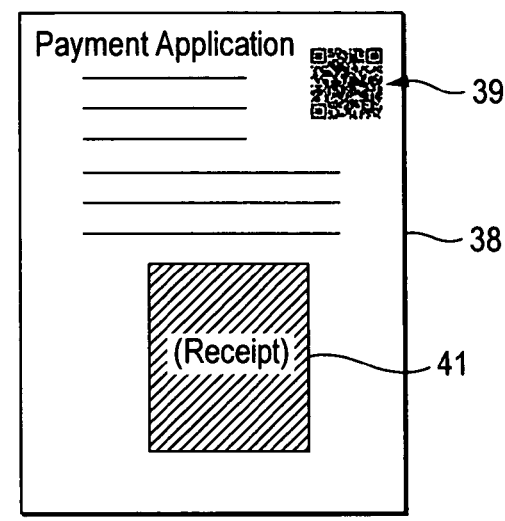

A QR code 39 which contains a document ID to be assigned to a payment application document 38 and other information is thereby attached, by printing, at a corner position, to the form of a payment application document 38 generated by the document generation apparatus 1. That is, a payment application document 38 to be generated by the document generation apparatus 1 corresponds to a "document to which a document ID is attached." The form of a payment application document 38 has a region 40 to which a receipt is to be stuck. As shown in FIG. 7B, an applicant generates an original of a payment application document 38 by sticking a receipt 41 to the form of a payment application document 38 and, if necessary, adding statements and putting his or her seal thereto.

After generating the payment application document 38 in the above manner, the applicant sets it on the document table of the document generation apparatus 1 and causes the image reading section 6 to read its image. Alternatively, the generated information is sent from the document generation apparatus 1 to the document management apparatus 2 over the network 4 and registered as data. The image data that have been produced by reading the payment application document 38 with the image reading section 6 are sent to the document management apparatus 2 over the network 4. The original of the payment application document 38 that has been read is filed, for example, and put in storage.

Receiving the image data (scanning data) of the payment application document 38 from the document generation apparatus 1, the document management apparatus 2 stores the image data in the database section 14 and acquires decoded information of the document ID assigned to the payment application document 38 by analyzing the QR code image contained in the received image data with the bar code analyzing section 12. The document management control section 15 registers the thus-acquired document ID in a document management table, which is stored in the database section 14.

FIG. 8 shows an exemplary document management table. As shown in FIG. 8, a "document ID," a "document generation date," a "document storage period," a "document disposal date," and "information on confirming the presence of an originality-assured electronic document" are registered in the document management table so as to be correlated with each other. The "document ID" may be one obtained by decoding a QR code with the bar code analyzing section 12 or one that was assigned to the document by the document management apparatus 2 itself or a separate server apparatus when it generated document data with a bar code (mentioned above). The "document generation date" is a date of generation of the document. In this embodiment, a date on which image data produced by reading the document such as the payment application document 38 with the document generation apparatus 1 are sent to the document management apparatus 2 is registered as a "document generation date."

The "document storage period" is the last date of a period in which the document should be kept in storage. Each document whose document ID is registered in the document management table should be kept in storage until the "document storage period" expires. If the "document storage period" registered is "unspecified," the document can be disposed of anytime. If the "document storage period" registered is "permanent," disposal of the document is always prohibited.

For example, if information for setting of a "document storage period" is contained, in addition to the document ID, in the QR code that is printed on the form of a payment application document 38, a "document storage period" can be set automatically on the basis of decoded information that is produced by the bar code analyzing section 12. More specifically, if information to the effect that the document storage period of the payment application document 38 should be set at 6 years is contained in the QR code, a date that is 6 years after the date of generation of the payment application document 38 can be set automatically as a "document storage period."

In general, as for receipts, the storage period is determined in accordance with the amount of money received. Therefore, if information indicating the amount of money received of a receipt to be stuck to the form of a payment application document 38 is contained in the QR code, a storage period of the receipt can be determined automatically from that information and registered as a "document storage period" in the document management table. Furthermore, a user can manually change or set a "document storage period" registered or to be registered in the document management table using the user interface section 11 of the document management apparatus 2.

The "document disposal date" is a date when the document was disposed of. Documents are disposed of by the document disposal apparatus 3. Therefore, a date when a notice of completion of disposal of a document (hereinafter also referred to as "disposal completion notice") is sent from the document disposal apparatus 3 to the document management apparatus 2 with designation of a document ID of a document that has been disposed of is registered in the document management table as a "document disposal date."

The "information on confirming the presence of an originality-assured electronic document" is information indicating whether presence of an originality-assured electronic document has been confirmed, and is caused to be registered by the document generation control section 9.

Each of the "document generation date," "document storage period," and "document disposal date" among the registration items of the document management table may be registered in the form of a date and time. It is preferable that a user ID of a user who has generated a document using the document generation apparatus 1 be registered in the document management table as information indicating a document generator or that a user ID of a user who has disposed of a document using the document disposal apparatus 3 be registered in the document management table as information indicating a document disposer. In such a case, ID information of the user who has generated or disposed of the document can be acquired by utilizing an existing user authentication technique (e.g., one using an IC card).

Figure 9:
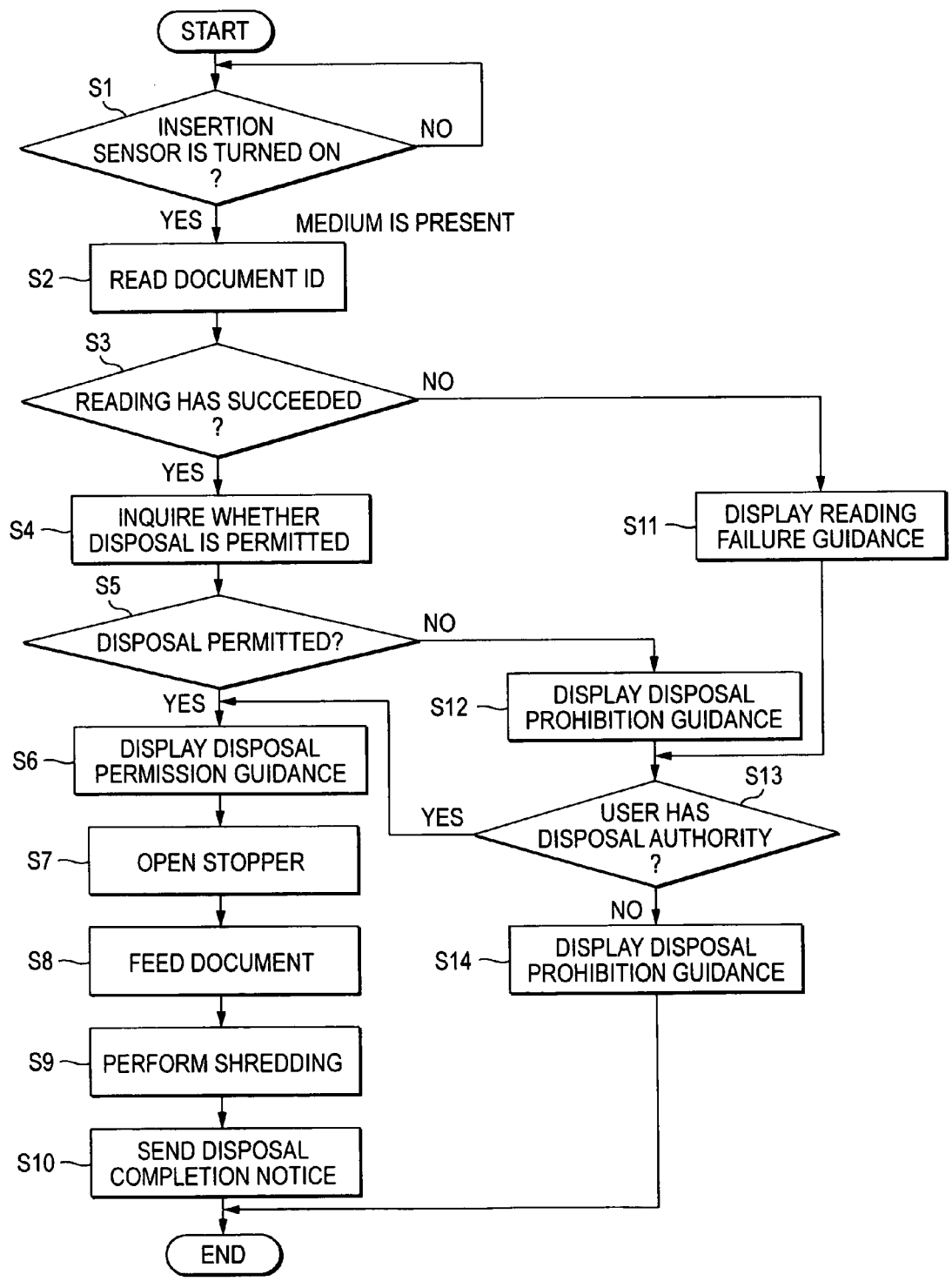
FIG. 9 is a flowchart of a processing procedure of a manual-feed-type document disposal apparatus.

FIG. 9 is a flowchart of a processing procedure which is followed when the manual-feed-type document disposal apparatus 3 disposes of a document. The document disposal apparatus 3 has an ordinary disposal mode in which code information (document ID) is not read and a scanning disposal mode in which code information is read. The flowchart of FIG. 9 shows a processing procedure of the scanning disposal mode.

In the ordinary disposal mode, when the start button on the operation panel 31 is depressed by a user in a state that the document disposal apparatus 3 is in a standby state, the document disposal control section 36 instructs the stopper driving section 33, the feeder driving section 34, and the shredder driving section 35 to start driving, whereby the stopper 20 is opened and driving of the feed rolls 21 and 22 and the shredder unit 24 is started. As a result, if the user of the document disposal apparatus 3 places a document as a subject of disposal on the document tray unit 17 and inserts it inward, the head of the document is nipped by the feed rolls 21 and the document is pulled into the apparatus 3. The document is transported as it is by the feed rolls 21 and 22 and shredded by the shredder unit 24.

If the stop button on the operation panel 31 is depressed by the user after the above-mentioned depression of the start button on the operation panel 31 or if a prescribed time has elapsed from the depression of the start button, the document disposal control section 36 instructs the stopper driving section 33, the feeder driving section 34, and the shredder driving section 35 to stop the driving, whereby the stopper 20 is returned to the original projected state and the driving of the feed rolls 21 and 22 and the shredder unit 24 is stopped. The document disposal apparatus 3 is thus returned to a standby state.

On the other hand, in the scanning disposal mode, if a user of the document disposal apparatus 3 places a document as a subject of disposal on the document tray unit 17 and inserts it inward, the insertion sensor 18 is turned on immediately before the head of the document butts against the stopper 20. If a QR code is printed on the document as the subject of disposal, the user should insert it in such a manner that its QR-code-printed surface is made the top surface.

While the document disposal apparatus 3 is in a standby state, at step S1 the document disposal control section 36 continuously monitors the output signal of the insertion sensor 18 (i.e., its on/off state). If the insertion sensor 18 is turned on as a result of the insertion of the document by the user, the document disposal control section 36 gives a bar code reading instruction to the bar code reader 32. At step S2, the bar code reader 32 reads the QR code (document ID) printed on the document in response to the reading instruction.

At step S3, the document disposal control section 36 judges whether the reading of the QR code has succeeded. Whether the reading of the QR code has succeeded is judged by judging whether the QR code printed on the document has been decoded correctly by the bar code reader 32. Exemplary situations that may cause the bar code reader 32 to fail in reading the QR code are that the QR code printed on the document is stained or damaged severely, no QR code is printed on the document, and the QR code of the document is located outside the code reading area E (see FIG. 5) because of an improper manner of insertion of the document.

If the reading of the QR code has succeeded (step S3: yes), at step S4 the document disposal control section 36 inquires of the document management apparatus 2 whether disposal of the document that is identified by the document ID contained in the QR code is permitted. This is done by generating a disposal permission inquiry message in which the document ID contained in the QR code read by the bar code reader 32 is designated and sending this inquiry message to the document management apparatus 2 via the network interface 16 and the network 4. That is, the document disposal permission inquiry is an inquiry as to whether disposal of the document that is identified by the document ID designated in the inquiry is permitted. If the reading of the QR code has succeeded, the information contained in the QR code may be displayed on the operation panel 31 in a simplified manner.

In the document management apparatus 2 which has received the inquiry message, the search section 13 conducts a search to determine whether the document ID designated in the inquiry message is registered in the document management table. If the document ID concerned exists in the document management table, the document management apparatus 2 checks a "document storage period" that is registered as corresponding to the document ID concerned. If the date of reception of the document disposal permission inquiry from the document disposal apparatus 3 is after the document storage period, the document management apparatus 2 returns, to the document disposal apparatus 3, a reply message to the effect that disposal of the document is permitted. If the date of reception of the document disposal permission inquiry from the document disposal apparatus 3 is not after the document storage period, the document management apparatus 2 returns, to the document disposal apparatus 3, a reply message to the effect that disposal of the document is prohibited.

The document disposal control section 36 receives, via the network interface 37, the reply message returned from the document management apparatus 2. At step S5, the document disposal control section 36 judges whether the reply message returned in response to the inquiry from the document disposal apparatus 3 itself is to permit disposal of the document. If the reply message is to permit disposal of the document, the document disposal control section 36 displays a disposal permission guidance (guide message; prepared in advance) on the operation panel 31 at step S6 and opens the stopper 20 by instructing the stopper driving section 33 to do so at step S7. At the same time, the document disposal control section 36 instructs the feeder driving section 34 to start rotating the feed rolls 21 and 22 and, in response, the feeder driving section 34 starts rotating the feed rolls 21 and 22. An exemplary disposal permission guidance is "The stopper will be opened to dispose of this document. Please insert the document further inward."

If the user inserts the document further according to the guidance displayed on the operation panel 31, the head of the document butts into the nip portion of the feed rolls 21 and the document is fed downstream along the document transport passage as the feed rolls 21 rotate (step S8). The document thus fed by the feed rolls 21 is passed to the feed rolls 22 which are located downstream of the feed rolls 21 in the transport direction, and is then transported to the shredder unit 24 as the feed rolls 22 rotate. When the tail of the document passes the sensing position of the insertion sensor 18 and the insertion sensor 18 is thereby switched from the on state to an off state, the document disposal control section 36 instructs, with preset timing (e.g., at a time point when the tail of the document passes the feed rolls 21), the stopper driving section 33 to return the stopper 20 to the original state (projected state) and the stopper 20 is thereby done so.

When the head of the document passes the sensing position of the passage sensor 23 while the document is being transported by the feed rolls 22 and the passage sensor 23 is thereby switched from the off state to an on state, the document disposal control section 36 instructs the shredder driving section 35 to start driving and, in response, the shredder driving section 35 starts driving the shredder unit 24. As a result, the document that has been fed by the feed rolls 22 is pulled into the shredder unit 24 as it is and shredded (disposed of) by the shredder unit 24 (step S9).

When the tail of the document passes the sensing position of the passage sensor 23 and the passage sensor 23 is thereby switched from the on state to an off state, at step S10 the document disposal control section 36 sends a disposal completion notice (message) which indicates that the disposal of the document concerned has been completed and in which the document ID of the document for which the document disposal permission was received a short while ago is designated, to the document management apparatus 2 after a lapse of a prescribed time (more specifically, a time that is taken until the tail of the document is pulled into the shredder unit 24 and the entire document is shredded) from the time point when the passage sensor 23 was turned off. The disposal completion notice (message) is sent to the document management apparatus 2 via the network interface 37 and the network 4. In the document management apparatus 2 which has received the disposal completion notice (message) from the document disposal apparatus 3, a date of reception of the message is registered in the column of the "document disposal date" as part of disposal history information corresponding to the document ID that is designated in the message.

On the other hand, if it is judged at step S3 that the reading of the QR code has failed, at step S11 a reading failure guidance which was prepared in advance is displayed on the operation panel 31. An exemplary reading failure guidance is "Disposal of this document is prohibited. Please pull out the document or, if you have disposal authority, input a user ID and a password." If disposal of the document is not permitted by the document management apparatus 2 at step S5, at step S12 a disposal prohibition guidance which was prepared in advance is displayed on the operation panel 31. An exemplary disposal prohibition guidance is "Disposal of this document is prohibited. Please pull out the document or, if you have disposal authority, input a user ID and a password."

If the user inputs user authentication information through the operation panel 31 after the guidance was displayed at step S11 or S12, at step S13 the document disposal control section 36 inquiries of the document management apparatus 2 whether the user has disposal authority. This is done by generating an inquiry message in which the user authentication information that has been input through the operation panel 31 is designated and sending it to the document management apparatus 2 via the network interface 37 and the network 4. For example, the user authentication information is numerals or alphanumeric characters or a combination thereof and consists of a user ID and a user password. The user authentication information may be information that is input after the guidance was displayed at step S11 or S12 or information that was input in advance.

In the document management apparatus 2 which has received the inquiry message, the search section 13 conducts a search to determine whether user authentication information that coincides with the user authentication information designated in the inquiry message is stored in the database 14. If such user authentication information exists, the document management apparatus 2 returns, to the document disposal apparatus 3, a reply message to the effect that the user has document disposal authority. If no such user authentication information exists, the document management apparatus 2 returns, to the document disposal apparatus 3, a reply message to the effect that the user does not have document disposal authority.

The document disposal control section 36 receives, via the network interface 37, the reply message returned from the document management apparatus 2. And the document disposal control section 36 checks whether the reply message returned in response to the inquiry from the document disposal apparatus 3 itself means that the user is authorized to dispose of documents. If the user is authorized to dispose of documents (step S13: yes), the document disposal control section 36 displays a disposal permission guidance which was prepared in advance on the operation panel 31 at step S6 in the same manner as described above and opens the stopper 20 by instructing the stopper driving section 33 to do so at step S7. If the reply message returned from the document management apparatus 2 means that the user is not authorized to dispose of documents (step S13: no), at step S14 the document disposal control section 36 displays a disposal prohibition guidance on the operation panel 31.

When sending the disposal completion notice at step S10, the document disposal apparatus 3 immediately returns to a standby state. On the other hand, when the disposal prohibition guidance is displayed at step S14, the document disposal apparatus 3 returns to a standby state after the insertion sensor 18 is switched from the on state to an off state (i.e., the user removes the document from the document tray unit 17).

Another embodiment of the invention will be described below. Even for important documents, disposal of their originals may be permitted in the case where corresponding electronic documents that satisfy prescribed requirements are stored, for example, in the case where electronic documents that comply with the e-document law are stored. For example, disposal of the originals of such documents as statements of delivery, bills, receipts of less than thirty thousand yen, written estimates, order sheets, contract proposal letters, articles of an association, materials for stockholders' meeting, sales reports, patients' case records, and prescriptions may be permitted as long as corresponding electronic documents that satisfy prescribed requirements for electromagnetic storage are stored. An example of the prescribed requirements for electromagnetic storage is that originality of an electronic document concerned is assured; for example, it has been subjected to a technical measure for preventing falsification.

A document management method of a document management system which is employed in the case where presence of an originality-assured electronic document is confirmed will be described below.

At step S4 in FIG. 9, in the document management apparatus 2 which has received the inquiry message, the search section 13 conducts a search to determine whether the document ID designated in the inquiry message is registered in the document management table. If the document ID concerned exists in the document management table, the document management apparatus 2 checks a "document storage period" that is registered as corresponding to the document ID concerned. If the date of reception of the document disposal permission inquiry from the document disposal apparatus 3 is after the "document storage period," the document management apparatus 2 returns, to the document disposal apparatus 3, a reply message to the effect that disposal of the document is permitted. If the date of reception of the document disposal permission inquiry from the document disposal apparatus 3 is not after the document storage period, the document management apparatus 2 returns, to the document disposal apparatus 3, a reply message to the effect that disposal of the document is prohibited.

Even in the latter case, if information to the effect that an originality-assured electronic document corresponding to the document ID concerned is stored is registered in the document management table, the document management apparatus 2 returns, to the document disposal apparatus 3, a reply message to the effect that disposal of the document is permitted. If information to the effect that an originality-assured electronic document corresponding to the document ID concerned is stored is not registered in the document management table, the document management apparatus 2 returns, to the document disposal apparatus 3, in the same manner as described above, a reply message meaning that disposal of the document is permitted or prohibited depending on the "document storage period."

The document disposal control section 36 receives, via the network interface 37, the reply message returned from the document management apparatus 2. At step S5, the document disposal control section 36 judges whether the reply message returned in response to the inquiry from the document disposal apparatus 3 itself is to permit disposal of the document. If the reply message is to permit disposal of the document, the document disposal control section 36 displays a disposal permission guidance (guide message; prepared in advance) on the operation panel 31 at step S6 and opens the stopper 20 by instructing the stopper driving section 33 to do so at step S7. At the same time, the document disposal control section 36 instructs the feeder driving section 34 to start rotating the feed rolls 21 and 22 and, in response, the feeder driving section 34 starts rotating the feed rolls 21 and 22. An exemplary disposal permission guidance is "The stopper will be opened to dispose of this document. Please insert the document further inward." The subsequent steps are the same as described above and hence will not be described.

FIG. 10 is a flowchart of a procedure which is followed when the document generation control section 9 causes registration, in the document management table, of information to the effect that an originality-assured electronic document corresponding to a document ID concerned is stored.

At step S15, the image reading section 6 reads a document and a QR code (document ID) printed on the document. At step S16, the document generation control section 9 calculates hash values of the read-out document. At step S17, the document generation control section 9 acquires, from an external authentication organization, an electronic signature generated on the basis of the hash values. That is, the document generation control section 9 sends the calculated hash values to the external authentication organization. The external authentication organization generates an electronic signature by, for example, encrypting the received hash values and returns the electronic signature to the document generation control section 9. At step S18, the document generation control section 9 attaches the electronic signature sent from the external authentication organization to the electronic document that was generated by reading the document with the image reading section 6, and stores the resulting electronic document in a prescribed storage device. If the electronic signature sent from the external authentication organization has been attached to the electronic document that was generated by reading the document with the image reading section 6 and the resulting electronic document has been stored in the prescribed storage device, at step S19 the document generation control section 9 judges that an originality-assured electronic document has been stored and causes registration of information to that effect in the document management table.

In the above embodiments, a document for which reading of a QR code fails and a document for which disposal permission is not obtained from the document management apparatus 2 are ejected to a common (same) ejection tray unit. However, the invention is not limited to such a case. A document for which reading of a QR code fails and a document for which disposal permission is not obtained from the document management apparatus 2 may be ejected to different ejection tray units by employing a gate member for switching between document transport passages (directions).

Since a document ID assigned to a document generated by using the document generation apparatus 1 is managed by the document management apparatus 2 so as to be correlated with a "document storage period," the document can be managed all the way from its generation to disposal.

When a document has been disposed of (i.e., shredded) by the document disposal apparatus 3, a disposal completion notice (message) in which its document ID is designated is sent to the document management apparatus 2 and, upon reception of the message, the document management apparatus 2 registers a "document disposal date" in the document management table as disposal history information corresponding to the document ID. Therefore, the actual date (preferably, date and time) of disposal of the document can be kept in storage as history information in association with the fact that the document was disposed of. It is also possible to keep in storage, as another piece of disposal history information, a user ID or the like of a person (document disposer) who was in charge of the disposal of the document. This makes it possible to later check when and by whom a document that is identified by a certain document ID was disposed of.

When a document is generated (printed) by the document generation apparatus 1, a date (preferably, date and time) of generation of the document and a user ID or the like of a person (document generator) who is in charge of the generation of the document, together with a document ID of the document, may be registered in the document management table of the document management apparatus 2. This makes it possible to later check when and by whom a document that is identified by a certain document ID was generated.

The manual-feed-type document disposal apparatus 3 can dispose of (a bundle of) plural document sheets at one time in such a manner that they are kept stapled. On the other hand, an automatic-feed-type document disposal apparatus can dispose of a document while judging, on a document-by-document basis, whether disposal is permitted without requiring any further manipulation by a user after the document is set on a document tray unit and a start button is pushed. A disposal-prohibited document is ejected onto an ejection tray.

Although in the above embodiments a document ID or a bar code is attached to a document by printing, the invention is not limited to such a case. For example, a document ID or a bar code may be attached to a document by sticking a label to the document.

Although in the above embodiments a document ID or a bar code of a document is read by the bar code reader 32 of the document disposal apparatus 3, the invention is not limited to such a case. For example, a document ID or a bar code may be read by the image reading section 6.

(Modification)

At the above-described step S13, once it has been recognized that a user is authorized to dispose of documents, inquiring of the document management apparatus 2 may be skipped until the user causes log-off processing. The document disposal apparatus 3 may be configured so that log-off processing may be caused by a user by performing a log-off manipulation through the operation panel 31, for example. This makes it unnecessary to judge, many times, whether a user has document disposal authority.

(Modification)

In the above embodiments, the bar code reader 32 reads a QR code. However, for example, a modification is possible in which the image reading section 6, a CCD camera (not shown), or the like reads a document and then an image processing apparatus (not shown) or the like recognizes a QR code that is printed on the document.

(Modification)

The document generation apparatus 1, all of the document management apparatus 2, and the document disposal apparatus 3 which constitute the document management system shown in FIG. 1 or two of them may be integrated into a single apparatus. In this case, their control sections, operation panels, or the like may be either integrated together or kept separate from each other.

(Modification)

For example, the above-described series of steps is realized in such a manner that a CPU (central processing unit; not shown) reads programs that are stored in a ROM (read-only memory; not shown) and execute those using a RAM (random access memory; not shown) as a work area.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

S1: IS INSERTION SENSOR TURNED ON?

S2: READ DOCUMENT ID.

MEDIUM IS PRESENT.

S3: HAS READING SUCCEEDED

S4: INQUIRE WHETHER DISPOSAL IS PERMITTED.

S5: IS DISPOSAL PERMITTED

S6: DISPLAY DISPOSAL PERMISSION GUIDANCE.

S7: OPEN STOPPER.

S8: FEED DOCUMENT.

S9: PERFORM SHREDDING.

S10: SEND DISPOSAL COMPLETION NOTICE.

S11: DISPLAY READING FAILURE GUIDANCE.

S12: DISPLAY DISPOSAL PROHIBITION GUIDANCE.

S13: DOES USER HAVE DISPOSAL AUTHORITY

S14: DISPLAY DISPOSAL PROHIBITION GUIDANCE.

What is claimed is:

1. A disposal processing system comprising:
a disposal section that disposes of a document;
an information input section to which a user information is input;
a reading section that reads identification information of the document, the identification information being included in an image on the document;
a judging section that makes a judgment as to whether disposal of the document is permitted on the basis of at least one of the identification information and the user information; and
a control section that controls the disposal section such that the disposal section disposes of the document on the condition that the judging section makes a judgment that the disposal of the document is permitted on the basis of at least one of the identification information and the user information and does not dispose of the document on the condition that the judging section makes a judgment that the disposal of the document is prohibited on the basis of both of the identification information and the user information.

2. The disposal processing system according to claim 1, the disposal section comprising a disposal restricting section that restricts the disposal of the document, and the control section controlling the disposal restricting section such that
the disposal restricting section cancels the disposal of the document on the condition that the controller has controlled the disposal section to dispose of the document.

3. The disposal processing system according to claim 1, further comprising a managing section that manages the identification information and additional information in such a manner that the identification information and the additional information are correlated with each other,
wherein the control section sends the managing section the identification information to obtain the additional information from the managing section, and the judgment section makes the judgment as to whether the disposal of the document is permitted on the basis of the additional information.

4. The disposal processing system according to claim 3, wherein the additional information includes at least one of a time, a date, and a date and a time of generation of the document, and the judging section makes the judgment whether the disposal of the document is permitted on the basis of at least one of elapsed hours, elapsed days, and elapsed days and hours from at least one of the time, the date, and the date and the time of the generation of the document.

5. The disposal processing system according to claim 3, wherein the managing section registers therein information indicating that the document has been disposed of on the condition that the disposal section disposes of the document.

6. The disposal processing system according to claim 1, wherein the judging section makes the judgment that the disposal of the document is prohibited on the condition that the reading section cannot read the identification information.

7. The disposal processing system according to claim 1, further comprising an input section that inputs into the control section information indicating that the disposal of the document is permitted.

8. The disposal processing system according to claim 1, wherein after the disposal of the document is prohibited on the basis of the identification information, the judging section makes a judgment that the disposal of the document is permitted on the basis of the user information.

9. A disposal processing system comprising:
a disposal section that disposes of a document;
an information input section to which a user information is input;
a reading section that reads encrypted identification information included in an image on the document;
an analyzing section that analyzes the encrypted identification information to obtain identification information of the document;
a judging section that makes a judgment as to whether disposal of the document is permitted on the basis of at least one of the identification information and the user information; and
a control section that controls the disposal section such that the disposal section disposes of the document on the condition that the judging section makes a judgment that the disposal of the document is permitted on the basis of at least one of the identification information and the user information and does not dispose of the document on the condition that the judging section makes a judgment that the disposal of the document is prohibited on the basis of both of the identification information and the user information.

10. The disposal processing system according to claim 9, the disposal section comprising a disposal restricting section that restricts the disposal of the document, and the control section controlling the disposal restricting section such that the disposal restricting section cancels the disposal of the document on the condition that the control section has controlled the disposal section to dispose of the document.

11. The disposal processing system according to claim 9, further comprising a managing section that manages the identification information and additional information in such a manner that the identification information and the additional information are correlated with each other,
wherein the control section sends the managing section the identification information to obtain the additional information from the managing, and the judgment section makes the judgment as to whether the disposal of the document is permitted on the basis of the additional information.

12. The disposal processing system according to claim 11, wherein the additional information includes at least one of a time, a date, and a date and a time of generation of the document, and the judging section makes the judgment whether the disposal of the document is permitted on the basis of at least one of elapsed hours, elapsed days and elapsed days and hours from at least one of the time, the date, and the date and the time of the generation of the document.

13. The disposal processing system according to claim 11, wherein the managing section registers therein information indicating that the document has been disposed of on the condition that the disposal section disposes of the document.

14. The disposal processing system according to claim 9, wherein the judging section makes the judgment that the disposal of the document is prohibited on the condition that the reading section cannot read the encrypted identification information.

15. The disposal processing system according to claim 9, further comprising an input section that inputs into the control section information indicating that the disposal of the document is permitted.

16. A disposal processing apparatus comprising:
a disposal section that disposes of a document;
an information input section to which a user information is input;
a reading section that reads identification information of the document, the identification information being included in an image on the document;
a judging section that makes a judgment as to whether disposal of the document is permitted on the basis of at least one of the identification information and the user information; and
a controller that controls the disposal section such that the disposal section disposes of the document on the condition that the judging section makes a judgment that the disposal of the document is permitted on the basis of at least one of the identification information and the user information and does not dispose of the document on the condition that the judging section makes a judgment that the disposal of the document is prohibited on the basis of both of the identification information and the user information.

17. A disposal processing apparatus comprising:
a disposal section that disposes of a document;
an information input section to which a user information is input;
a reading section that reads encrypted identification information included in an image on the document;
an analyzing section that analyzes the encrypted identification information to obtain identification information of the document;
a judging section that makes a judgment as to whether disposal of the document is permitted on the basis of at least one of the identification information and the user information; and
a controller that controls the disposal section such that the disposal section disposes of the document on the condition that the judging section makes a judgment that the disposal of the document is permitted on the basis of at least one of the identification information and the user information and does not dispose of the document on the condition that the judging section makes a judgment that the disposal of the document is prohibited on the basis of both of the identification information and the user information.

18. A disposal processing system comprising:
a document managing section that holds document management information;
an information input section to which a user information is input;
a reading section that reads an image on a document;
a registering section that registers a presence of an originality-assured electronic version of the document in the document management section;
a disposal section that disposes of the document;
a recognizing section that recognizes identification information from the image; and a control section that sends at least one of the identification information and the user information to the document managing section and controls the disposal section such that the disposal section disposes of the document on the basis of at least one of the user information and the originality-assured electronic version of the document is registered in the document managing section and does not dispose of the document on the basis of both of the user information and the originality-assured electronic version of the document is not registered in the document managing section.

19. A disposal processing system comprising:

a document managing section that holds document management information;

an information input section to which a user information is input;

a reading section that reads encrypted identification information included in an image on a document;

a registering section that registers a presence of an originality-assured electronic version of the document in the document management section;

a disposal section that disposes of the document;

an analyzing section that analyzes the encrypted identification information to obtain identification information; and a control section that sends at least one of the identification information and the user information to the document managing section and controls the disposal section such that the disposal section disposes of the document on the basis of at least one of the user information and the originality-assured electronic version of the document is registered in the document managing section and does not dispose of the document on the basis of both of the user information and the originality-assured electronic version of the document is not registered in the document managing section.

20. A disposal processing system comprising:

a disposal section that disposes of a document;

an information input section to which a user information is input;

a reading section that reads identification information of the document, the identification information being included in an image on the document;

a judging section that makes a judgment as to whether disposal of the document is permitted on the basis of at least one of the identification information and the user information; and a control section that controls the disposal section such that the disposal section disposes of the document on the condition that the judging section makes a judgment that the disposal of the document is permitted on the basis of at least one of the identification information and the user information and does not dispose of the document on the condition that the judging section makes a judgment that the disposal of the document is prohibited on the basis of both of the identification information and the user information, and the disposal section disposes of the document on the condition that when the reading section fails to read the identification information the judging section makes a judgment that the disposal of the document is permitted on the basis of the user information.

* * * * *